(12) United States Patent
Das et al.

(10) Patent No.: US 8,842,529 B2
(45) Date of Patent: Sep. 23, 2014

(54) NETWORK TRANSPORT SYSTEM WITH HYBRID DYNAMIC BANDWIDTH ALLOCATION MECHANISM AND METHOD OF OPERATION THEREOF

(75) Inventors: Abhimanyu Das, Los Angeles, CA (US); Deyi Dong, Shanghai (CN); Eugene Lee, San Jose, CA (US); Dongsheng Zhang, Fremont, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 636 days.

(21) Appl. No.: 12/753,705

(22) Filed: Apr. 2, 2010

(65) Prior Publication Data

US 2011/0242974 A1    Oct. 6, 2011

(51) Int. Cl.
*H04L 12/911*    (2013.01)

(52) U.S. Cl.
CPC .............. *H04L 47/781* (2013.01); *H04L 47/70* (2013.01); *H04L 47/74* (2013.01); *H04L 47/748* (2013.01); *H04L 47/78* (2013.01)
USPC ....................................................... 370/230

(58) Field of Classification Search
CPC ....... H04L 47/781; H04L 47/70; H04L 47/74; H04L 47/748; H04L 47/78
USPC ........................ 370/229–238, 395.4, 437, 468
See application file for complete search history.

(56) References Cited

U.S. PATENT DOCUMENTS

| | | | |
|---|---|---|---|
| 4,063,220 A | 12/1977 | Metcalfe et al. | |
| 7,072,295 B1 * | 7/2006 | Benson et al. | 370/230 |
| 7,085,281 B2 | 8/2006 | Thomas et al. | |
| 7,245,628 B2 | 7/2007 | Shi et al. | |
| 7,362,975 B2 | 4/2008 | Choi et al. | |
| 7,564,852 B2 | 7/2009 | Das et al. | |
| 7,653,084 B2 | 1/2010 | Shin et al. | |
| 2003/0123482 A1 * | 7/2003 | Kim et al. | 370/468 |
| 2004/0109689 A1 * | 6/2004 | Song et al. | 398/69 |
| 2007/0041384 A1 * | 2/2007 | Das et al. | 370/395.4 |
| 2007/0133989 A1 * | 6/2007 | Kim et al. | 398/69 |
| 2008/0267626 A1 | 10/2008 | Niu | |

OTHER PUBLICATIONS

White Paper entitled "Intelligent Dynamic Bandwidth Allocation for Ethernet Passive Optical Networks", May 2, 2007, Document No. 400145, Revision 1.0, Cortina Systems, Inc.

(Continued)

*Primary Examiner* — Luat Phung

(74) *Attorney, Agent, or Firm* — Ishimaru & Associates LLP

(57) ABSTRACT

A method of operation of a network transport system includes: determining a congestion mode based on a total bandwidth request meeting or exceeding a bandwidth threshold, where the congestion mode indicates a level of network traffic and the total bandwidth request is a sum of all bandwidth requests for accessing the network; calculating a fixed information rate schedule grant based on a fixed information rate list to create a bandwidth grant for a fixed information rate request; calculating a low latency schedule grant based on a low latency list to create the bandwidth grant for a low latency request; calculating a main schedule grant for allocating an available bandwidth based on the congestion mode, where the main schedule grant is calculated using a weighted maximum-minimum fairness method when the congestion mode indicates congestion; and generating a grant packet for defining a transmission schedule of a first network unit.

18 Claims, 7 Drawing Sheets

(56) References Cited

OTHER PUBLICATIONS

Assi et al., "Dynamic Bandwidth Allocation for Quality-of-Service Over Ethernet PONs", vol. 21, No. 9, Nov. 2003, pp. 1467-1477, vol. 21 i9, IEEE Journal on Selected Areas in Communications.
Kramer et al., "IPACT: A Dynamic Protocol for an Ethernet PON (EPON)",Topics in Lightwave, Feb. 2002, pp. 74-80, vol. 40 i2, IEEE Communications Magazine.
Bai et al, "On the fairness of dynamic bandwidth allocation schemes in Ethernet passive optical networks", Jan. 17, 2006, pp. 2123-2135, vol. 29 i11, Computer Communications.
PAS5201 Gigabit Ethernet PON OLT—PAS5201 Gigabit Ethernet PON OLT Product Brief. URL: http://www.pmc- sierra.com/products/details/pas5201/index.html, 2009.
EPON FTTH Broadband Access Products URL: http://www.pmc-sierra.com/ftth-pon/epon.html, 2009.
Optical Line Terminals, Teknovus URL: http://www.teknovus.com/Products/Optical-Line-Terminals, 2009.
"Hardware-Based Dynamic Bandwidth Allocation Powers Triple-Play EPON From Teknovus; KDDI's FTTH Deployment Uses Teknovus EPON Technology", Posted on May, 2005 URL: http://www.redorbit.com/news/technology/151462/hardwarebased_dynamic band width allocation powers tripleplay epon from technovus kddis/.
Fujimoto NNT, "Multiple LLIDs / ONU", Sep. 30-Oct. 3, 2002, IEEE802.3 ah EFM, New Orleans URL:http://grouper.ieee.org/groups/802/3/efm/public/sep02/p2mp/fujimoto_p2mp_1_0902.pdf.
Choi et al., "Dynamic Bandwidth Allocation Algorithm for Multimedia Services over Ethernet PONs", Dec. 2002, pp. 465-468, ETRI Journal, vol. 24, No. 6.
Chang et al., "Overview of 10Gb/s EPON Status, Requirements and Applications", May 2009, Version 2.4, Ethernet Alliance, Beaverton URL:http://www.ethernetalliance.org/files/static_page_files/ACF586A4-1D09-3519-ADAC82B586E5A655/10GEPON_WP_EA_from%20FC_Final_updated_V2d4.pdf.

\* cited by examiner

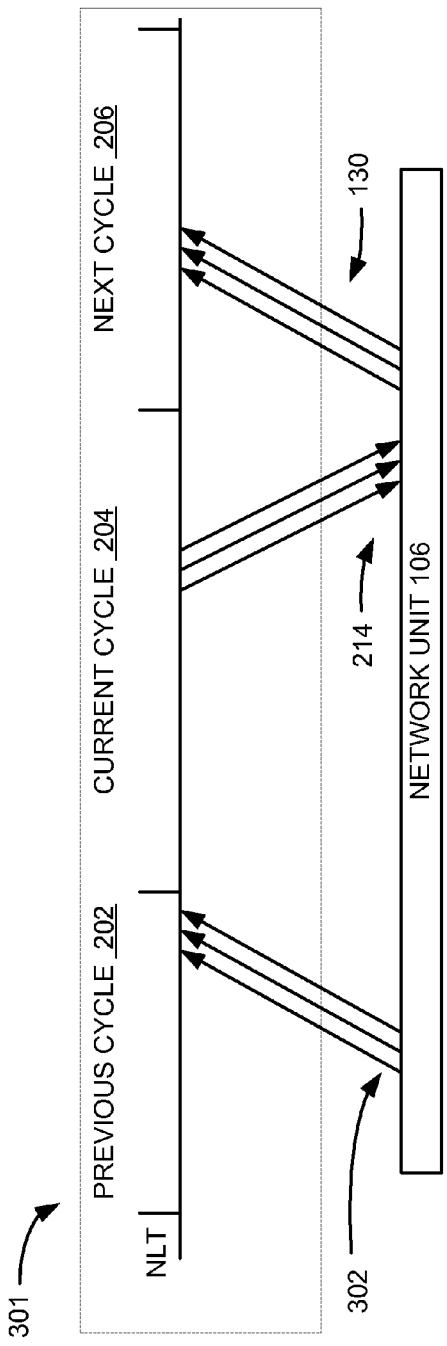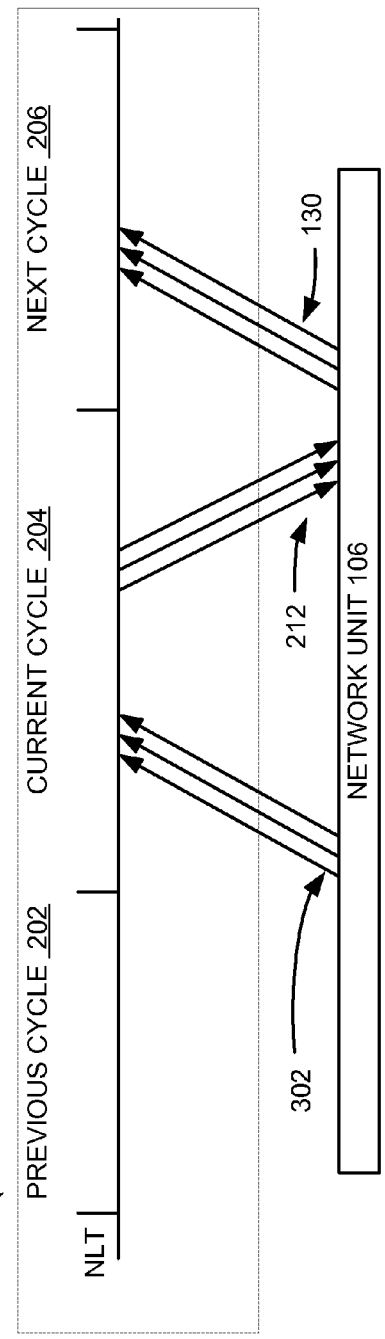

NETWORK TRANSPORT SYSTEM WITH HYBRID DYNAMIC BANDWIDTH ALLOCATION MECHANISM AND METHOD OF OPERATION THEREOF

TECHNICAL FIELD

The present invention relates generally to a network transport system, and more particularly to a network transport system with dynamic bandwidth allocation.

BACKGROUND ART

The rapid growth of the Internet has led to an increase in the size and complexity of network applications. Email and text-based chat have given way to bandwidth intensive applications and services such as Voice over IP (VoIP), Internet Protocol Television (IPTV) and Video-on-Demand (VoD). This has led to a growing demand for network capacity and the need for high capacity, high performance network transport systems to satisfy that need.

Network infrastructure has been developed to bring high performance network capacity to the Wide Area Network and Metropolitan Network level. However, there remains a need to address the "last mile" connection between the high performance Internet backbone at the Service Provider's Central Office (CO) and the business or residential customer locations.

Various techniques are used to improve performance of a network transport system to increase the capacity of the data being transmitted while maintaining appropriate Quality of Service (QOS) levels and making trade-offs between competing performance requirements. Such improved performance is necessary in order to reduce latency and jitter, increase throughput, maintain accuracy, allocate bandwidth, allow flexibility through programmability, increase scalability, and reduce implementation complexity.

Thus, a need still remains for a network transport system with dynamic bandwidth allocation mechanism for increasing system capacity, improving transmission reliability, and increasing transmission performance. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a network transport system including: determining a congestion mode based on a total bandwidth request meeting or exceeding a bandwidth threshold, where the congestion mode indicates a level of network traffic and the total bandwidth request is a sum of all bandwidth requests for accessing the network; calculating a fixed information rate schedule grant based on a fixed information rate list to create a bandwidth grant for a fixed information rate request; calculating a low latency schedule grant based on a low latency list to create the bandwidth grant for a low latency request; calculating a main schedule grant for allocating an available bandwidth based on the congestion mode, where the main schedule grant is calculated using a weighted maximum-minimum fairness method when the congestion mode indicates congestion; and generating a grant packet for defining a transmission schedule of a first network unit.

The present invention provides a network transport system including: a control unit for determining a congestion mode based on a total bandwidth request meeting or exceeding a bandwidth threshold, where the congestion mode indicates a level of network traffic and the total bandwidth request is a sum of all bandwidth requests for accessing the network; a hardware accelerator, coupled to the control unit, for calculating a fixed information rate schedule grant based on a fixed information rate list to create a bandwidth grant for a fixed information rate request; a report processing module, coupled to the hardware accelerator, for calculating a low latency schedule grant based on a low latency list to create the bandwidth grant for a low latency request; a main schedule computation module, coupled to the control unit, for calculating a main schedule grant for allocating an available bandwidth based on the congestion mode, where the main schedule grant is calculated using a weighted maximum-minimum fairness method when the congestion mode indicates congestion; and an arbiter module, coupled to the hardware accelerator, for generating a grant packet for defining a transmission schedule of a first network unit.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 3 is an example of a main schedule processing timeline.

FIG. 4 is an example of a low latency schedule processing timeline.

BEST MODE FOR CARRYING OUT THE INVENTION

Figure 1:
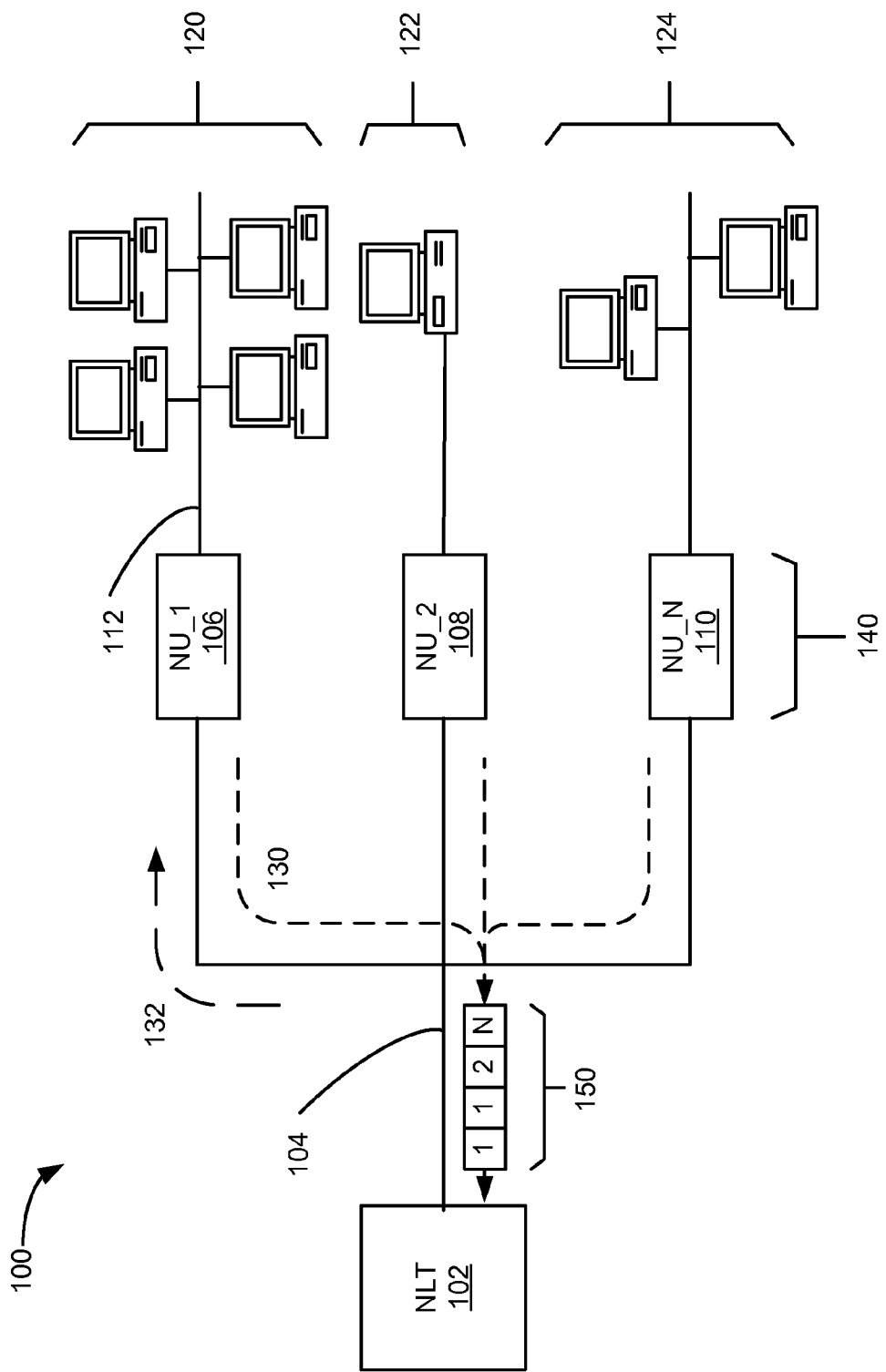
FIG. 1 is an example of a network transport system with hybrid dynamic bandwidth allocation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an example of a network transport system 100 with hybrid dynamic bandwidth allocation mechanism in an embodiment of the present invention. The network transport system 100 is defined as a system for distributing information to and from subscribers on a network. The network transport system 100 can include a network line terminal 102, connected to a first network unit 106 via a first communication path 104, such as a fiber optic cable or optical connection.

The network line terminal 102 is a network device at the service provider's central office that connects the high speed network link to multiple local subscribers operating at a lower speed. The network line terminal 102 can provide functionalities including transport, multiplexing, switching, management, supervision, or a combination thereof, for transmitting client signals via the first communication path 104. For example, the network line terminal 102 can include components such as hardware, software, memory, dedicated computational units, or any combination thereof.

The network line terminal 102 can send a downstream traffic 132 to the first network unit 106 including data, traffic management control information, video, text, images, or any combination thereof. The downstream traffic 132 is defined as the network information being transmitted from the network line terminal 102 down to the first network unit 106.

The first network unit 106 can send an upstream traffic 130 to the network line terminal 102. The upstream traffic 130 is defined as the network information being transmitted from the first network unit 106 up to the network line terminal 102.

As an example, the first network unit 106 is a device that can distribute network information from a higher speed network connection to multiple lower speed network connections. The first network unit 106 is located downstream from the network line terminal 102 located at the service provider's central office. The first network unit 106 can be connected to a first subscriber unit 120 via a second communication path 112 and is often referred to a network unit at a customer premise.

The network transport system 100 can include the first network unit 106, a second network unit 108, and an nth network unit 110. As an example, the second network unit 108 and the nth network unit 110 are in the same or similar network topology relationship to the network line terminal 102 as is the first network unit 106 in that both are downstream from the network line terminal 102. In this example, the "nth" designation in the nth network unit 110 symbolizes that there may be any number of network units that are downstream from the network line terminal 102.

Also as an example, the second network unit 108 and the nth network unit 110 can have the same or different transfer characteristics with each other, the first network unit 106, the other network units between 2 and nth, or a combination thereof. The first network unit 106, the second network unit 108, the nth network unit 110, or a combination thereof can provide the same or different functions.

A registered network unit list 140 is defined as the list of network units that are registered and coupled to the network line terminal 102 including the first network unit 106, the second network unit 108, and the nth network unit 110. The registered network unit list 140 is used to describe all the registered network units as a single entity.

The upstream traffic 130 can include a grant request 150, data, control information, status reports, video, text, images, or any combination thereof. As an example, the first network unit 106 can send the grant request 150 to the network line terminal 102 to indicate a request to transmit network information.

For illustrative purposes, the network transport system 100 is described with the network line terminal 102 as a single device, although it is understood that the network line terminal 102 can have different configurations including as a single device or multiple devices with a partitioning of functionality between the multiple devices.

The first communication path 104 can include a variety of network types. For example, the communication path can include optical fiber channels, multi-spectral optical channels, electrical channels, wireless communications, wired communication, or any combination thereof.

The first network unit 106 can provide functionalities including receiving information, sending information, transport, multiplexing, switching, management, supervision, or any combination thereof. For example, the first network unit 106 can receive network information from the network line terminal 102 and distribute the information to the first subscriber unit 120. The first network unit 106 can transmit network information to the network line terminal 102.

For illustrative purposes, the network transport system 100 is described with the first network unit 106 as a single device, although it is understood that the first network unit 106 can have different configurations including as a single device or multiple devices with a partitioning of functionality between the multiple devices.

The second communication path 112 can include a variety of network types. For example, the communication path can include optical fiber channels, multi-spectral optical channels, electrical channels, wireless communications, wired communication, or any combination thereof.

The first subscriber unit 120 can include a variety of component types. The first subscriber unit 120 can include a computer, grid computer unit, router, network switch, hub, monitoring device, traffic analyzer, dedicated functional unit, mobile device, handheld device, embedded system, or any combination thereof. The network transport system 100 can also include a second subscriber unit 122 and an nth subscriber unit 124.

The network transport system 100 can include any number of the first network unit 106 including the second network unit 108 and the nth network unit 110. The network transport system 100 can include any number of the first subscriber unit 120 including the second subscriber unit 122 and the nth subscriber unit 124.

Figure 2:
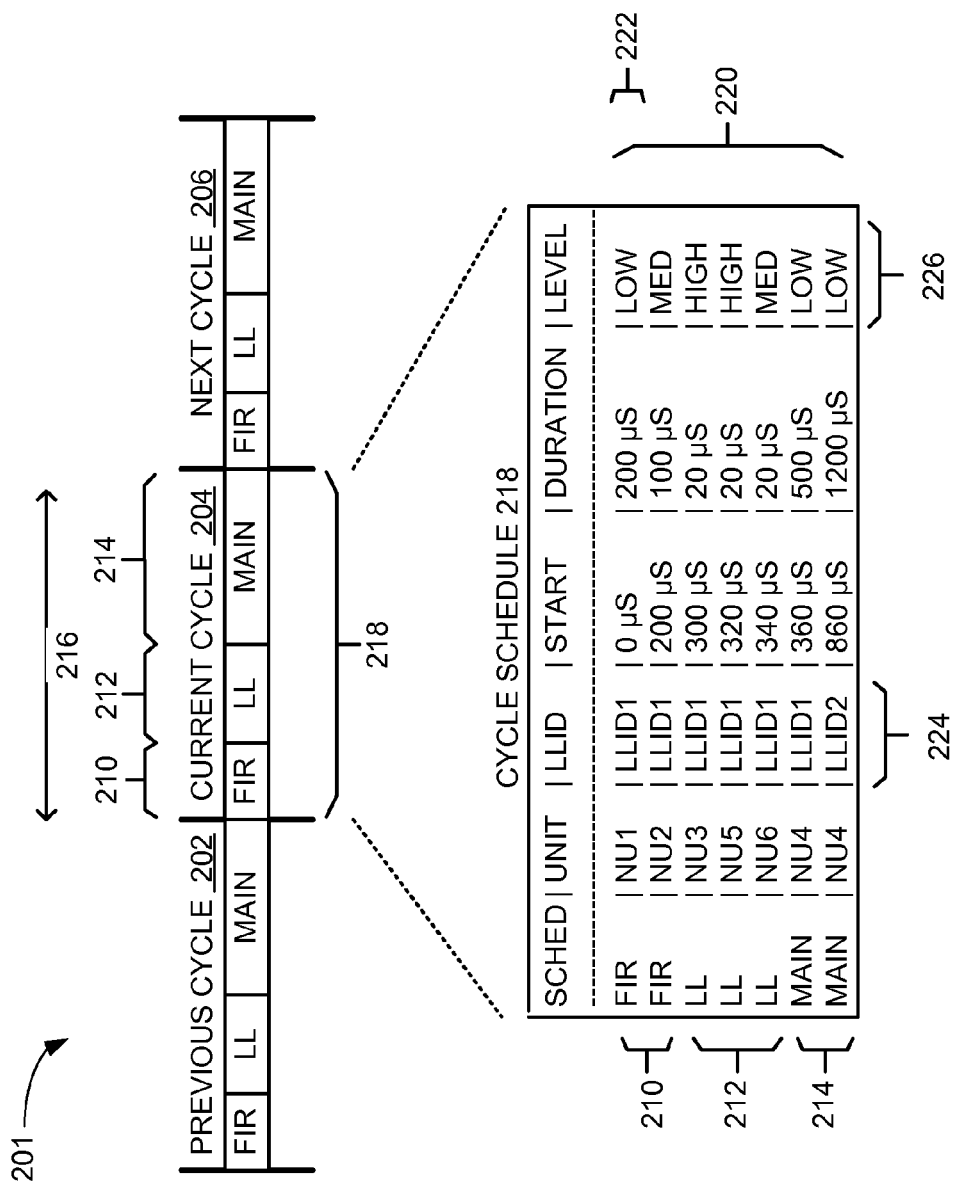
FIG. 2 is an example of a cycle-based scheme.

Referring now to FIG. 2, therein is shown an example of a cycle based scheme 201. The network transport system 100 can use the cycle based scheme 201 to arbitrate the upstream bandwidth from the registered network unit list 140 of FIG. 1 to the network line terminal 102 of FIG. 1. The cycle based scheme 201 defines the relationship and information flow between successive cycles used to allocate bandwidth. The cycle based scheme 201 is used to schedule the upstream transmission without overlapping the transmission from different network units.

As an example, the cycle based scheme 201 is shown with a previous cycle 202, a current cycle 204, and a next cycle 206. A configured cycle time 216 is the duration of the current cycle 204. A cycle schedule 218 is to schedule the upstream transmission without overlapping the transmission for the current cycle 204 of the cycle based scheme 201. Information from the previous cycle 202 can be used to modify the allocation of bandwidth in the current cycle 204. Information from the current cycle 204 can be used to modify the next cycle 206. The information flow between cycles is described in a later section.

For example, the first network unit 106 can limit the transmission of the upstream traffic 130 of FIG. 1 to the network line terminal 102 by only transmitting data during time intervals assigned to the first network unit 106 in the cycle schedule 218. The first network unit 106 can receive a bandwidth grant 222 that can define when the first network unit 106 can transmit information to the network line terminal 102. The bandwidth grant 222 defines the start time, duration, and a grant level 226 when the first network unit 106 can transmit information upstream to the network line terminal 102 for a logical link identifier 224 The grant level 226 defines a priority for the bandwidth grant 222 for the logical link identifier 224. For example, the grant level 226 can indicate a high priority, a medium priority, or a low priority.

The cycle schedule 218 can have a partition of the current cycle 204 into a network grant list 220 including the bandwidth grant 222. The cycle schedule 218 can be used to schedule the transmission of data from the first network unit 106 to the network line terminal 102 without overlapping the transmission of data from the second network unit 108. The cycle schedule 218 can include a main schedule grant 214 and two auxiliary schedules including a fixed information rate schedule grant 210 and a low latency schedule grant 212.

The fixed information rate schedule grant 210 defines the amount of time allocated within the current cycle 204 for the transmission of fixed information rate data for all network units in the registered network unit list 140, including the first network unit 106, the second network unit 108, and the nth network unit 110. The fixed information rate schedule grant 210 can include information that defines the start time and duration that the first network unit 106 can send fixed information rate data upstream to the network line terminal 102. The fixed information rate schedule grant 210 can include start time and duration for each network unit connected to the network line terminal 102.

Fixed information rate data is data that is transmitted at rate that does not change, changes slowly, or changes predictably over time. Fixed information rate data can include status messages, high priority customer data, time division multiplexing (TDM) data, timing information, regular transmissions, or any combination thereof.

The low latency schedule grant 212 defines the amount of time allocated in the current cycle 204 for the transmission of low latency data from all network units in the registered network unit list 140, including the first network unit 106, the second network unit 108, and the nth network unit 110. Low latency data is defined as data that requires transmission as soon as possible with the least amount of delay before transmission. Low latency data can include performances sensitive links such as video, audio, control system information, synchronization information, or any combination thereof.

The low latency schedule grant 212 can include information that defines the start time and duration when the first network unit 106 can send low latency information upstream to the network line terminal 102. The low latency schedule grant 212 can include the start time and duration for each network unit connected to the network line terminal 102.

The cycle schedule 218 can include the main schedule grant 214. The main schedule grant 214 defines the amount of time assigned to the transmission of data that is not defined as fixed information rate data or low latency data. The main schedule grant 214 also defines the amount of time assigned to the second network unit 108 within the current cycle 204.

The main schedule grant 214 can include information that defines the start time and duration when the first network unit 106 can send information upstream to the network line terminal 102. The main schedule grant 214 can include the start time and duration for each network unit connected to the network line terminal 102.

Referring now to FIG. 3, therein is an example of a main schedule processing timeline 301. The main schedule processing timeline 301 defines the timing of events that occur during the calculation of the cycle schedule 218 of FIG. 2 The main schedule processing timeline 301 depicts the processing that occurs across multiple cycles including the previous cycle 202, the current cycle 204, and the next cycle 206.

As an example, the main schedule processing timeline 301 can begin by receiving a traffic information report 302 from the first network unit 106 in the previous cycle 202. The traffic information report 302 provides the information about the current operating status of the network that is used to calculate the cycle schedule 218. The traffic information report 302 can provide information about the bandwidth demand for the first network unit 106. The traffic information report 302 can indicate the upstream traffic rate from the first subscriber unit 120 connected to the first network unit 106. The traffic information report 302 can include information about the level of congestion, packet sizes, network traffic levels, network statistics, or any combination thereof. The traffic information report 302 can include information from other reports that are defined in later sections.

The network line terminal 102 an calculate the main schedule grant 214 using the traffic information report 302 during the previous cycle 202 and send the main schedule grant 214 to the first network unit 106 during the current cycle 204. The first network unit 106 can then transmit the upstream traffic 130 data to the network line terminal 102.

The main schedule processing timeline 301 can require two cycles to complete the process of receiving the traffic information report 302, generating the main schedule grant 214, and sending the main schedule grant 214 to the first network unit 106.

Referring now to FIG. 4, therein is shown an example of a low latency schedule processing timeline 401. The low latency schedule processing timeline 401 can describe the processing required to calculate the low latency schedule grant 212 of FIG. 2 across multiple cycles including the current cycle 204, the previous cycle 202, and the next cycle 206. The low latency schedule grant 212 can include the grant information for low-latency network connections.

As an example, the low latency schedule processing timeline 401 can begin by a receiving the traffic information report 302 from the first network unit 106 in the current cycle 204. The network transport system 100 can calculate the low latency schedule grant 212 using the traffic information report 302 during the current cycle 204 and send the low latency schedule grant 212 to the first network unit 106 during the current cycle 204. The main schedule processing timeline 301 can be performed in one cycle to complete the process of receiving the traffic information report 302, generating the low latency schedule grant 212, and sending the low latency schedule grant 212 to the first network unit 106.

Figure 5:
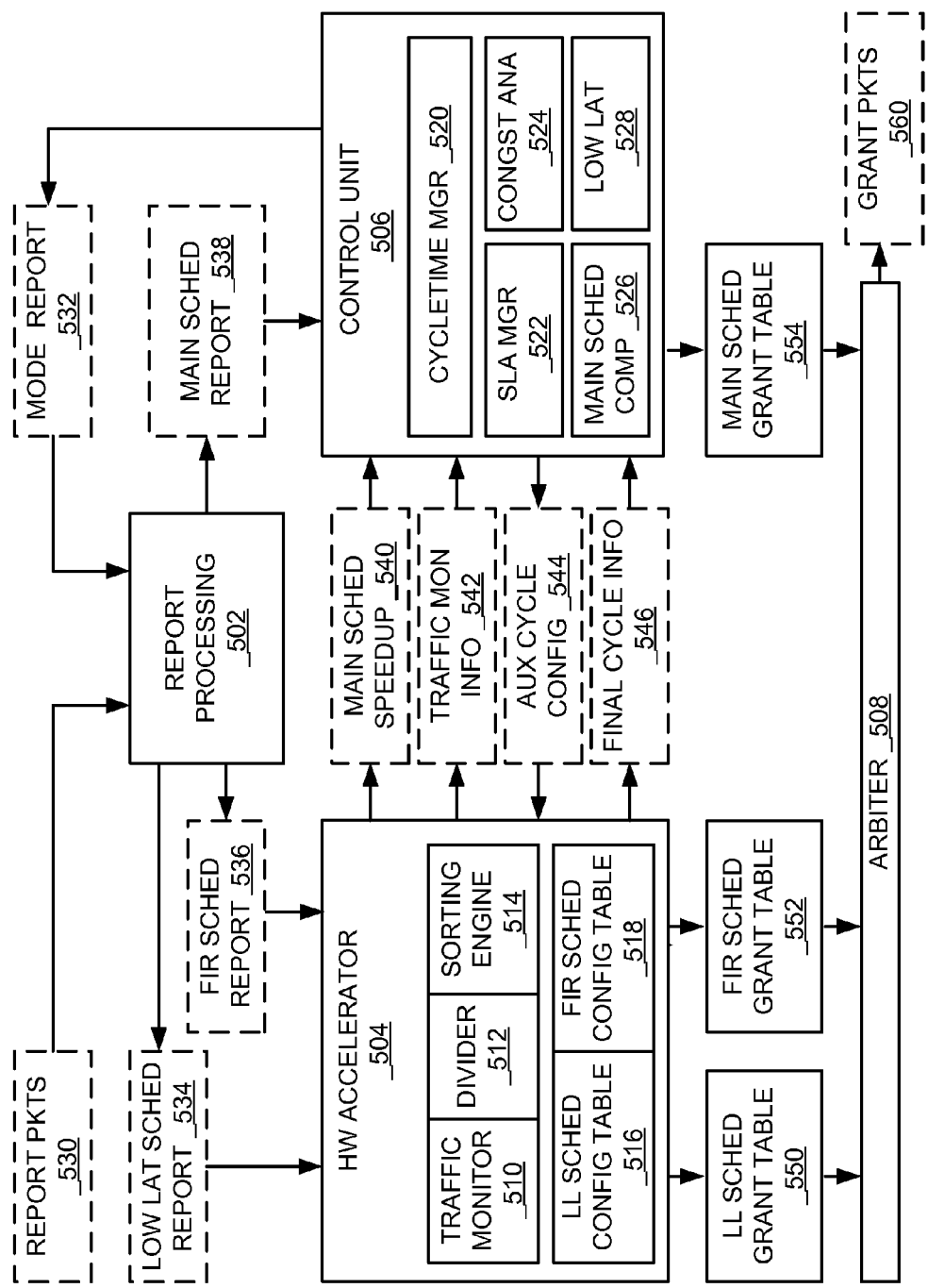
FIG. 5 is a block diagram of the network line terminal.

Referring now to FIG. 5, therein is shown a block diagram of the network line terminal 102. The network line terminal 102 can include a report processing module 502, a hardware accelerator 504, a control unit 506, and an arbiter module 508.

The network line terminal 102 can calculate the cycle schedule 218 of FIG. 2 using the report processing module 502, the control unit 506, the hardware accelerator 504, and the arbiter module 508. For example, the fixed information rate schedule grant table 552 can be calculated by the hardware accelerator 504 using a service level agreement information 633 and a configured cycle time 216. The service level agreement information 633 is described in a later section.

In another example, the hardware accelerator 504 can generate a low latency schedule grant table 550 and a fixed information rate schedule grant table 552 using a low latency schedule report 534; a fixed information rate schedule report 536 from the report processing module 502; the service level agreement information 633, the cycle length information, and an auxiliary cycle configuration report 544 from the control unit 506.

The control unit 506 can generate a main schedule grant table 554 using information from the report processing module 502 and the hardware accelerator 504 including a main schedule report 538, a main schedule speedup report 540, a traffic monitoring information 542, and a final cycle information 546. The main schedule speedup report 540 can provide information about the reduction in the amount of time needed to calculate the fixed information rate schedule grant table 552 and the low latency schedule grant table 550. The traffic monitoring information 542 can provide information about the level of network traffic as processed by the traffic monitor 510. The final cycle information 546 can include detailed information about the low latency schedule grant 212 and the fixed information rate schedule grant 210.

The control unit 506 is a compute engine for general purpose computation, for specific application computation, or a combination thereof. For example, the control unit 506 can be a microprocessor, a microcontroller, a computer, a cloud computer, a distributed computing element, or any combination thereof. The control unit 506 can include software modules such as a cycletime manager module 520, a service level agreement manager module 522, a congestion analysis module 524, a low latency module 528, and a main schedule computation module 526.

The control unit 506 can execute software modules to implement the functionality of the network line terminal 102. The ability of the control unit 506 to execute software modules provides an additional level of flexibility and programmability to the network line terminal 102 that allows the addition or change of functionality over time.

The control unit 506 can implement an iterative, cycle-based method to dynamically allocate bandwidth for the upstream data channel between the first network unit 106 and the network line terminal 102. The control unit 506 can calculate the cycle schedule 218 and the main schedule grant 214.

The control unit 506 can coordinate the fixed information rate schedule grant 210 and the low latency schedule grant 212 on the hardware accelerator 504. The control unit 506 can be responsible for core system management and the allocation of work between the hardware accelerator 504 and the control unit 506.

The report processing module 502 processes network information messages from the first network unit 106 and distribute reports about the network status to the control unit 506 and the hardware accelerator 504. The report processing module 502 can receive a report packet 530 from the first communication path 104.

The report packet 530 is a message from the first network unit 106 that provides network traffic information about the request for bandwidth for each of the logical link identifier 224 of the first network unit 106. The report packet 530 can include requested grant size, priority, congestion information, status information, or any combination thereof.

The report processing module 502 can be implemented in different ways and can include different implementations depending on which functional unit or external units are being interfaced with the report processing module 502. The report processing module 502 can be implemented in hardware, software, or a combination thereof. For example, the report processing module 502 can be implemented by executing software on the control unit 506, by dedicated hardware coupled to the hardware accelerator 504, or by a combination of hardware and software portioned between the hardware accelerator 504 and the control unit 506.

The report processing module 502 can be coupled with the control unit 506 and the hardware accelerator 504. The report processing module 502 can process the report packet 530 and a mode report 532 to generate and send the low latency schedule report 534 and the fixed information rate schedule report 536 to the hardware accelerator 504.

The report processing module 502 can receive the mode report 532 from the control unit 506. The mode report 532 can represent information including command information, operational parameters, status information, or any combination thereof. The mode report 532 can be represented in a variety of ways including a single parameter, an array of parameters, or any combination thereof.

The report processing module 502 can send information to the control unit in a variety of ways. For example, the report processing module 502 can generate the main schedule report 538 and send it to the control unit 506. The main schedule report 538 can provide the control unit 506 with network information generated by processing the report packet 530. The main schedule report 538 can include the list of active LLIDs for the first network unit 106, the traffic information report 302, mode information, or any combination thereof.

The report processing module 502 can send information to the hardware accelerator 504 in a variety of ways. For example, the report processing module 502 can send the low latency schedule report 534 and the fixed information rate schedule report 536 to the hardware accelerator 504. The low latency schedule report 534 can include information to identify low latency LLIDs. The fixed information rate schedule report 536 can include information about fixed information rate LLIDs.

The cycletime manager module 520 calculates the cycle schedule 218. For example, the cycletime manager module 520 can be implemented as a software module that executes on the control unit 506. The cycletime manager module 520 can calculate the cycle schedule 218 that can include the fixed information rate schedule grant 210, the low latency schedule grant 212, and the main schedule grant 214. For example, the cycletime manager module 520 can determine the configured cycle time 216. The cycletime manager module 520 can interface with the service level agreement manager module 522, the congestion analysis module 524, the low latency module 528, and the main schedule computation module 526 to determine the cycle schedule 218.

The congestion analysis module 524 determines the level of network congestion. For example, the congestion analysis module 524 can be implemented as a software module that executes on the control unit 506. The congestion analysis module 524 can process the main schedule report 538 and calculate the level of network congestion.

The service level agreement manager module 522 can provide information about the service level agreement of the first network unit 106 and the information is incorporated in the mode report 532. For example, the service level agreement manager module 522 can be implemented as a software module that executes on the control unit 506 and distributes the service level agreement information 633 to the main schedule computation module 526. The first network unit 106 can have the service level agreement information 633 that defines the minimum and maximum levels of service the first network unit 106.

The service level agreement manager module 522 can extract the service level agreement information 633 in a variety of ways. For example, the service level agreement information 633 can be manually entered in the network line terminal 102 for the first network unit 106. In another example, the service level agreement information 633 can be sent from the first network unit 106 to the network line terminal 102. In yet another example, the service level agreement information 633 can be changed dynamically by the first network unit 106 and sent to the network line terminal 102. The service level agreement information 633 can include the peak information rate 642, a committed information rate, a maximum burst size, a maximum delay, a minimum amount of bandwidth, a maximum amount of bandwidth, a maximum amount of latency, a maximum jitter, a packet size, or any combination thereof.

The low latency module 528 generates the list of low latency logical list identifiers. For example, the low latency module 528 can be implemented as a software module that executes on the control unit 506. The low latency module 528 can receive the main schedule report 538 from the report processing module 502 and generate a list of logical link identifiers that have a status that indicates a low latency performance requirement. Low latency performance requirements can include performances sensitive links such as video, audio, control system information, synchronization information, or any combination thereof.

The control unit 506 can calculate the mode report 532. The mode report 532 can describe the status of the control unit 506. The mode report 532 can include information about the level of congestion, the service level agreement information 633, and the list of low latency logical link identifiers.

The main schedule computation module 526 calculates the main schedule grant 214. The main schedule computation module 526 can receive the main schedule report 538 from the report processing module 502 and the main schedule speedup report 540 and the traffic monitoring information 542 from the hardware accelerator 504 to calculate the main schedule grant 214. The main schedule grant 214 can be calculated using the traffic monitoring information 542, the main schedule speedup report 540, the main schedule report 538, the final cycle information 546, the service level information, the list of low latency LLIDs, and the level of congestion. The main schedule computation module 526 can send the main schedule grant table 554 to the arbiter module 508 for generating a grant packet 560. The calculation of the main schedule grant 214 is detailed in a later section.

The hardware accelerator 504 can include hardware modules to perform dedicated operations including sorting with a sorting engine 514, division with a divider 512, and monitoring network traffic with a traffic monitor 510. The hardware accelerator 504 can also include a low latency schedule configuration table 516 and a fixed information rate schedule configuration table 518 to store schedule information.

The hardware accelerator 504 can be implemented in a number of different ways. For example, the hardware accelerator 504 can be a dedicated logic circuit, a hardware finite state machine, a parallel processor, a digital signal processor, an integrated circuit, discrete logic, a math co-processor, a pipelined processor, or any combination thereof. The hardware accelerator can be implemented in different configurations including a single hardware unit, separate discrete hardware units, multiple distributed hardware units, an external circuit, or any combination thereof.

The hardware accelerator 504 can calculate the fixed information rate schedule grant 210 using the fixed information rate schedule report 536, traffic monitoring information, and the auxiliary cycle configuration report 544. The fixed information rate schedule grant 210 can include information about fixed information rate network grants.

The hardware accelerator 504 can calculate the low latency schedule grant 212 using the low latency schedule report 534, traffic monitoring information, and the auxiliary cycle configuration report 544. The low latency schedule grant 212 can define the bandwidth grant 222 for low latency network grants. The hardware accelerator 504 can also generate the status and network information reports to be sent to the control unit 506 including the main schedule speedup report 540, the traffic monitoring information 542, and the final cycle information 546.

The traffic monitor 510 is a hardware module coupled to the hardware accelerator 504 that determines the network traffic statistics that can be used to generate the cycle schedule 218. The traffic monitor 510 can process network information in a variety of ways. For example, the traffic monitor 510 can monitor traffic information directly to estimate traffic statistics. In another example, the traffic monitor 510 can process reports and information from the report processing module 502 including the low latency schedule report 534 and the fixed information rate schedule report 536 for calculating network traffic statistics. The traffic monitor 510 can measure the minimum and maximum packet sizes, packet counts, upstream fragmentation loss, or any combination thereof.

The divider 512 is a hardware module that can compute the divisor of two numbers. The divider 512 can be implemented in different ways. For example, the divider 512 can be implemented as a dedicated logical circuit, an arithmetic logic unit (ALU), a mathematical co-processor, or any combination thereof. The divider 512 can perform division in hardware faster than division can be performed in software on the control unit 506.

The sorting engine 514 is a hardware module that can sort an array of numbers in ascending or descending order depending on the hardware configuration and control settings. The sorting engine 514 can perform sorting in hardware faster than the same sorting can be performed in software on the control unit 506. The sorting engine 514 is used to reduce the amount of time required to sort information and to calculate the cycle schedule 218. The sorting engine 514 can be implemented in a variety of configurations. For example the sorting engine 514 can be implemented by a dedicated logic circuit, a pipelined processor, an array processing unit, a mathematic co-processor, or any combination thereof.

The arbiter module 508 functions to process the information about the cycle schedule 218 and generate the grant packet 560 that can be sent to the first network unit 106 to implement the dynamic bandwidth allocation mechanism. For example, the grant packet 560 can include the bandwidth grant 222 for the first network unit 106.

The arbiter module 508 can receive the low latency schedule grant table 550, the fixed information rate schedule grant table 552, from the hardware accelerator 504. The arbiter module can also receive the main schedule grant table 554 from the control unit 506. The arbiter module 508 can combine the information and generate the grant packet 560 using the fixed information rate schedule grant table 552, the low latency schedule grant table 550, and the main schedule grant table 554.

The arbiter module 508 can be implemented in different ways and can include different implementations depending on which functional unit or external units are being interfaced with the arbiter module 508. The arbiter module 508 can be implemented in hardware, software, or a combination thereof. For example, the arbiter module 508 can be implemented by executing software on the control unit 506, by dedicated hardware coupled to the hardware accelerator 504, or by a combination of hardware and software partitioned between the hardware accelerator 504 and the control unit 506.

Figure 6:
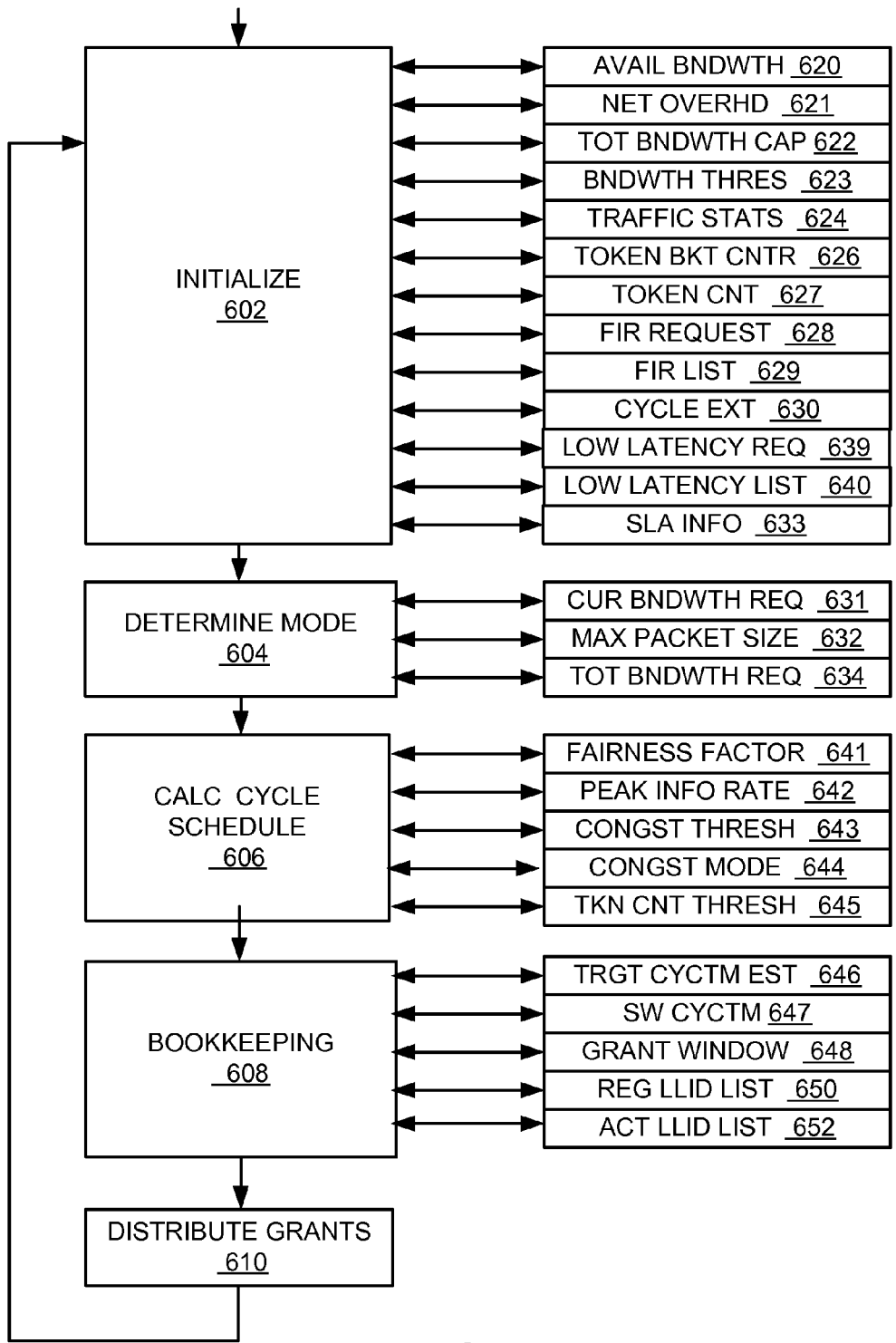
FIG. 6 is a flow chart of the network transport system with hybrid dynamic bandwidth allocation mechanism.

Referring now to FIG. 6, therein is shown a flow chart of the network transport system 100 with hybrid dynamic bandwidth allocation. The network line terminal 102 can initialize the system, determine a congestion mode 644, calculate the cycle schedule 218 of FIG. 2 based on the congestion mode 644, update the information for the next cycle, and distribute the schedule information. The congestion mode 644 defines the level of network traffic congestion and is used to determine the method used to calculate the main schedule grant 214.

The network transport system 100 with hybrid dynamic bandwidth allocation can receive the report packet 530 from the first network unit 106, calculate the cycle schedule 218, and generate the grant packet 560 for defining the transmission schedule for the first network unit 106.

In the network line terminal 102 as an example, each module is indicated by a number and successively higher module numbers follow one another. Control flow can pass from one module to the next higher numbered module unless explicitly otherwise indicated. While the invention has been described in conjunction with a specific control flow order, it is understood that the many alternatives, modifications, and variations will be apparent to those skilled in the art. Accordingly, it is intended to embrace all such alternatives, modifications, and variation that fall within the scope of the included claims. The control flow order between modules can be implemented in a different order. All matters hithertofore set forth herein or shown in the accompanying drawings are to be interpreted in an illustrative and non-limiting sense.

The network line terminal 102 can be operated in several different ways. For example, the network line terminal 102 can be operated as a single unit that can include both the hardware and software components of FIG. 5. In another example, the hardware and software components of the network line terminal 102 can be implemented in separate units.

The network line terminal 102 can receive network information and perform initial calculations in an initialize module 602. The initialize module 602 can receive the traffic information report 302 of FIG. 3 and calculate an available bandwidth 620. After the initialize module 602 has successfully completed, the control flow can be transferred to a determine mode module 604.

The initialize module 602 can receive the traffic information report 302 by receiving the report packet 530 of FIG. 5, a registered logical link identifier list 650, traffic monitoring statistics information, a token count 627 or any combination thereof. The first network unit 106 can have one or more network connections that are represented by the logical link identifier 224 of FIG. 2 that can represent a logical link between the network line terminal 102 and the first network unit 106. The first network unit 106 can send the report packet 530 containing network status information to the network line terminal 102. The token count 627 defines the number of tokens allocated to the logical link identifier 224 for the current cycle 204 and represents the number of the grant request 150.

The initialize module 602 can extract a fixed information rate request 628, a low latency request 639, and a cycle extension information 630 from the report packet 530. The fixed information rate request 628 is the grant request 150 for a fixed information rate network connection. The fixed information rate request 628 can be used to calculate the fixed information rate schedule grant 210. The low latency request 639 can be used to calculate the low latency schedule grant 212. The low latency request 639 is the grant request 150 that has a status that indicates that it is a low latency network connection. The initialize module 602 can read a low latency list 640 from the mode report 532. The low latency list 640 can be used to calculate the low latency schedule grant 212. The low latency list 640 is the list of the low latency request 639, indicated by the logical link identifier 224 having a status that the network connection is low latency.

The initialize module 602 can calculate the available bandwidth 620 that defines the amount of bandwidth that be allocated for transmission in a cycle. The available bandwidth 620 can be calculated based on the information in the report packet 530. For example, the available bandwidth 620 can be calculated as the configured cycle time 216 minus a network overhead 621. The network overhead 621 can include bandwidth associated with discovery and register-acknowledgement packets. The network overhead 621 is the amount of bandwidth that is required for network operation and not specifically used to transmit subscriber information. The configured cycle time 216 can include the amount of time allocated to the current cycle 204.

The network line terminal 102 can determine the level of network congestion in the determine mode module 604. The determine mode module 604 can determine the congestion mode 644 for the current cycle 204. After the determine mode module 604 has successfully completed, the control flow can be transferred to a calculate cycle schedule module 606.

The determine mode module 604 can determine the congestion mode 644 by comparing a total bandwidth request 634 to a bandwidth threshold 623. If the total bandwidth request 634 meets or exceeds the bandwidth threshold 623, then the congestion mode 644 is set to "congestion". If the total bandwidth request 634 is less than the bandwidth threshold 623, then the congestion mode 644 is set to "non-congestion".

The total bandwidth request 634 is the total amount of bandwidth being requested by each of the logical link identifier 224 listed in the registered logical link identifier list 650.

The total bandwidth request 634 can be calculated by summing a current bandwidth request 631 for each of the logical link identifier 224 associated with the registered logical link identifier list 650. The current bandwidth request 631 is the amount of bandwidth being requested in the grant request 150.

The registered logical link identifier list 650 can include the logical link identifier 224 with the token count 627 greater than a token count threshold 645. The token count 627 defines the number of tokens allocated to the logical link identifier 224 for the current cycle 204 and represents the number of the grant request 150.

The current bandwidth request 631 for each of the logical link identifier 224 can be calculated by summing the minimum of either a report request 720 or a peak information rate 642 for the logical link identifier 224 in the registered logical link identifier list 650 plus the network overhead 621. The report request 720 is defined as the amount of bandwidth being requested by the logical link identifier 224. For example, the report request 720 can be equal to the grant request 150.

The bandwidth threshold 623 can vary based on a total bandwidth capacity 622 and the level of network traffic that indicates the network is congested. The total bandwidth capacity 622 is defined as the maximum amount of network capacity for the network. For example, if the network has the total bandwidth capacity 622 of 1 gigabyte per second, then the bandwidth threshold 623 can be set to a value of 1 gigabyte per second.

The network line terminal 102 can calculate the cycle schedule 218 in the calculate cycle schedule module 606. The cycle schedule 218 can include the fixed information rate schedule grant 210, the low latency schedule grant 212, and the main schedule grant 214. After the calculate cycle schedule module 606 has completed, the control flow can pass to a bookkeeping module 608.

The calculate cycle schedule module 606 can calculate the cycle schedule 218 using an iterative, cycle-based method to allocate the available bandwidth 620 to an active logical link identifier list 652. The iterative cycle based method calculates the cycle schedule 218 for the current cycle 204 using information from the previous cycle 202. Each iteration represents a single cycle and the process repeats every cycle. For example, the calculate cycle schedule module 606 can check the congestion mode 644, calculate the cycle schedule 218 based on the congestion mode 644 and a fairness factor 641, and generate the grant packet 560.

The cycle schedule 218 can be calculated by partitioning the current cycle 204 into three schedules and allocating bandwidth to each schedule. The fixed information rate schedule grant 210 can allocate bandwidth for the grant request 150 for fixed information rate connections. The low latency schedule grant 212 allocates bandwidth for the grant request 150 for low latency connections. The main schedule grant 214 allocates bandwidth for the grant request 150 that are not low latency or fixed information rate connections.

The fixed information rate schedule grant 210 and the low latency schedule grant 212 are calculated by the hardware accelerator 504 and bandwidth can be allocated based on the grant request 150 received in the report packet 530. The fixed information rate schedule grant 210 and the low latency schedule grant 212 are described in more detail in a later section.

The main schedule grant 214 is calculated by allocating bandwidth to the grant request 150 for those connections that are not fixed information rate or low latency connection requests. The main schedule grant 214 is calculated based on the congestion mode 644 and the grant request 150 received in the report packet 530. If the congestion mode 644 indicates "non-congestion", then the main schedule grant 214 can be calculated using a pre-allocation method. If the congestion mode 644 indicates "congestion", then the main schedule grant 214 can be calculated using a weighted maximum-minimum fairness method. The calculation of the main schedule grant 214 is described in more detail in a later section.

The network line terminal 102 can update and configure system control parameters in the bookkeeping module 608. The bookkeeping module 608 can estimate the target cycletime, update the service level agreement and local databases, and identify the low-latency LLID and fixed information rate LLID list. The bookkeeping module 608 can also perform the fixed information rate schedule and the low latency schedule configuration, and calculate the software cycle time used to calculate the main schedule grant 214. When the bookkeeping module 608 has completed, the control flow can pass to a distribute grants module 610.

The bookkeeping module 608 can calculate a target cycletime estimate 646 by examining the report packet 530 and the mode report 532 and adding up the estimated duration of the fixed information rate schedule grant 210, the low latency schedule grant 212, and the main schedule grant 214. The target cycletime estimate 646 is defined as the estimated amount of time required for the cycle schedule 218. The actual duration of the cycle schedule 218 may vary depending on the actual network traffic information in the report packet 530 for the current cycle 204. The target cycletime estimate 646 can be used in preliminary calculations until the actual duration can be calculated. For example, if the fixed information rate schedule grant 210 has a duration of 10 µs, the low latency schedule grant 212 has a duration of 21 µs, and the main schedule grant 214 has a duration of 61 µs, then the target cycletime estimate 646 can be calculated by adding up the durations to get a value of 82 µs.

The bookkeeping module 608 can update the service level agreement database by extracting service level agreement information 633 for the logical link identifier 224 from the service level agreement manager module 522 and storing the service level agreement information 633 in the service level agreement database. The service level agreement database can be implemented as a memory unit such as a database, a disk file, an array, a random access memory, or any combination thereof.

The bookkeeping module 608 can update the local database with information extracted from the report packet 530. The local database is a memory that can be used to temporarily store information used to calculate the cycle schedule 218. The local database can include network traffic information, the congestion mode 644, the grant request 150, the peak information rate 642, temporary values, grant information, request information, status information, logical link lists, or any combination thereof.

The bookkeeping module 608 can identify the low latency list 640 by examining the report packet 530, identifying the logical link identifier 224 that has the low latency request 639, and adding the logical link identifier 224 to the low latency list 640. The bookkeeping module 608 can identify a fixed information rate list 629 by examining the service level agreement information 633 and the configured cycle time 216, identifying if the logical link identifier 224 has the fixed information rate request 628, and adding the logical link identifier 224 to the fixed information rate list 629.

The bookkeeping module 608 can perform the fixed information rate configuration by calculating the fixed information rate schedule grant 210 in a variety of methods. For example, the fixed information rate schedule grant 210 can be calculated by creating the bandwidth grant 222 for each of the logical link identifier 224 in the fixed information rate list 629. The bandwidth grant 222 can include the start time, the duration, and the grant level that can be used to transmit information for the logical link identifier 224.

The bookkeeping module 608 can perform the low latency schedule configuration by calculating the low latency schedule grant 212. The low latency schedule grant 212 can be calculated in a variety of methods. For example, the low latency schedule grant 212 can be calculated by creating the bandwidth grant 222 for each of the logical link identifier 224 in the low latency list 640. The bandwidth grant 222 can include the start time, the duration, and the grant level that can be used to transmit information for the logical link identifier 224.

The bookkeeping module 608 can calculate a software cycletime 647 by determining if the total amount of time required by the cycle schedule 218 is different from the amount of time estimated in the target cycletime estimate 646. The software cycletime 647 is defined as the actual amount of time required by the cycle schedule 218. If the total time is less than the target cycletime estimate 646, then the software cycletime 647 can be increased to take advantage of the available time. If the total time is more than the target cycletime estimate 646, then the software cycletime 647 can be reduced to accommodate the larger time requirement for the fixed information rate schedule grant 210 and the low latency schedule grant 212.

It has been discovered that the present invention provides the network transport system 100 with dynamic bandwidth allocation with improved speed for calculating the low latency schedule grant 212 and the fixed information rate schedule grant by performing the calculations using the hardware accelerator 504. The low latency schedule grant 212 and the fixed information rate schedule grant 210 allocate bandwidth for the low latency and fixed information rate network connections. The network line terminal 102 or the bookkeeping module 608 can increase the speed of calculating the low latency schedule grant 212 and the fixed information rate schedule grant 210 by using dedicated hardware to perform the calculation. This allows for an improved dynamic bandwidth allocation where the network line terminal 102 can more quickly calculate the bandwidth grant 222 for the grant request 150 for the low latency and fixed information rate connection requests.

The network line terminal 102 can be implemented using a combination of functional units of the network line terminal 102 of FIG. 5. For example, the network line terminal 102 can be implemented by running the software modules on the control unit 506 of FIG. 5, while processing sorting data on the sorting engine 514 of FIG. 5 of the hardware accelerator 504 of FIG. 5.

The initialize module 602 can be implemented with the report processing module 502 of FIG. 5 and the control unit 506. For example, the report processing module 502 can receive the report packet 530 and the mode report 532 and generate the fixed information rate schedule report 536, the low latency schedule report 534, and the main schedule report 538.

The determine mode module 604 can be implemented in several ways. For example, the determine mode module 604 can be implemented using the control unit 506, the report processing module 502, and the main schedule report 538. The control unit 506 can receive the main schedule report 538 from the report processing module 502 and determine the congestion level of the network.

In another example, the determine mode module 604 can be implemented with the congestion analysis module 524 and can process the report packet 530 to calculate the congestion mode 644. The congestion mode 644 can indicate when the total bandwidth request 634 is greater than a congestion threshold 643. The congestion analysis module 524 can communicate with the report processing module 502 to receive the main schedule report 538 to calculate the congestion mode 644.

The calculate cycle schedule module 606 can be implemented with the report processing module 502, the hardware accelerator 504, the control unit 506 and the arbiter module 508. For example, the calculate cycle schedule module 606 can use the arbiter module 508 to generate the grant packet 560 to send the cycle schedule 218 to the network units.

The calculate cycle schedule module 606 can also be implemented with the software modules of the control unit 506 including the cycletime manager module 520 of FIG. 5, the service level agreement manager module 522, the congestion analysis module 524 of FIG. 5, the main schedule computation module 526 and the low latency module 528. For example, the calculate cycle schedule module 606 can calculate the main schedule grant 214 using the control unit 506 and the cycletime manager module 520.

The calculate cycle schedule module 606 can further be implemented with the hardware modules of the hardware accelerator 504 including the traffic monitor 510, the divider 512 of FIG. 5, the sorting engine 514 of FIG. 5, the low latency schedule configuration table 516 of FIG. 5, and the fixed information rate schedule configuration table 518 of FIG. 5. For example, the calculate cycle schedule module 606 can calculate the main schedule grant 214 using the sorting engine 514 and the divider 512.

The bookkeeping module 608 can be implemented with the control unit 506, the cycletime manager module 520, the service level agreement manager module 522, the low latency module 528, the hardware accelerator 504, the low latency schedule configuration table 516, the fixed information rate schedule configuration table 518, the traffic monitor 510, the divider 512, the sorting engine 514, the low latency schedule configuration table 516 and the fixed information rate schedule configuration table 518. For example, the fixed information rate schedule grant 210 can be calculated using the parameters stored in the fixed information rate schedule configuration table 518.

The distribute grants module 610 can be implemented using the arbiter module 508, the low latency schedule grant table 550, the fixed information rate schedule grant table 552, and the main schedule grant table 554. For example, the grant packet 560 can be generated using the fixed information rate schedule grant table 552 to generate the fixed information rate schedule grant 210. In another example, the arbiter module 508 can process the information in the low latency schedule grant table 550, the fixed information rate schedule grant table 552, and the main schedule grant table 554 and generate the grant packet 560 by creating the grant packet 560 and appending the bandwidth grant 222 for the first network unit 106 to the grant packet 560.

Figure 7:
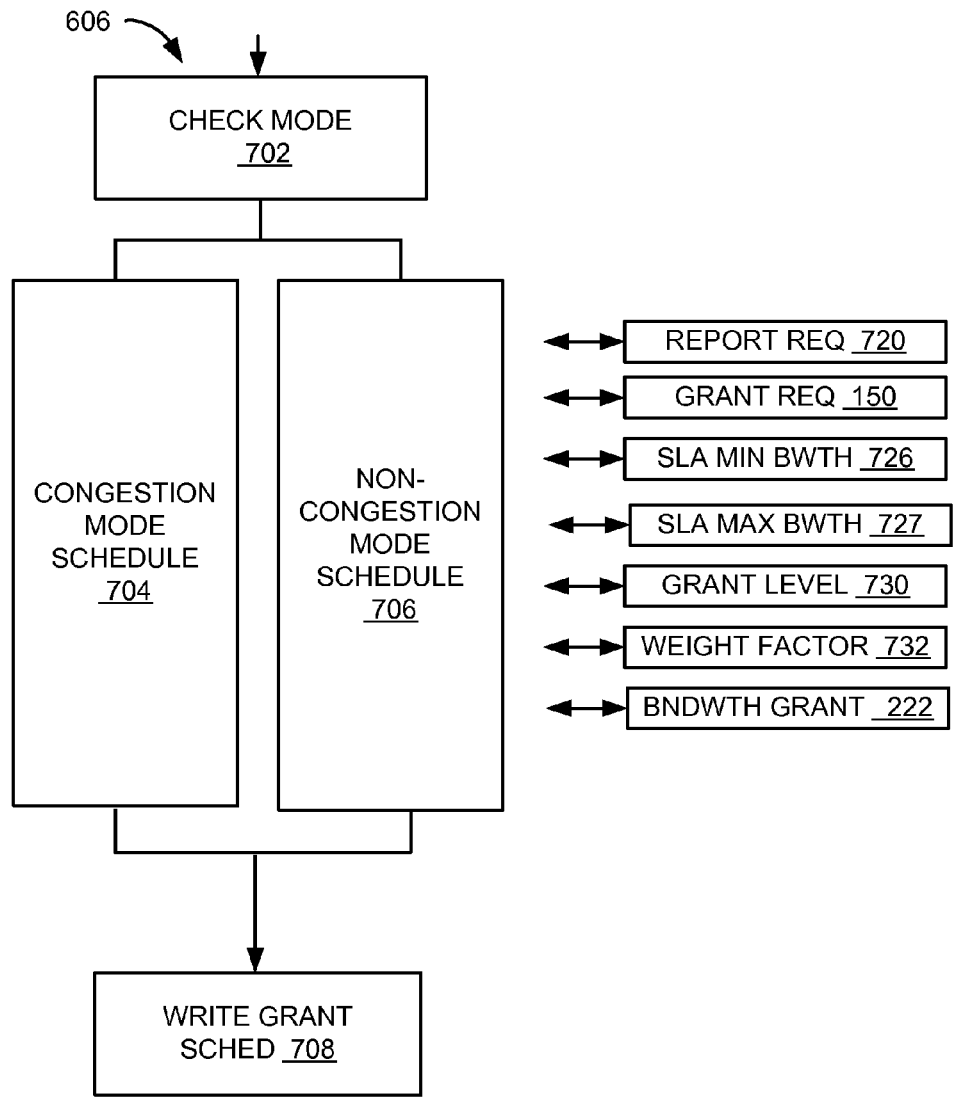
FIG. 7 is a detailed flow chart the calculate schedule cycle module of FIG. 6.

Referring now to FIG. 7, therein is shown detailed flow chart of the calculate cycle schedule module 606 of FIG. 6. The calculate cycle schedule module 606 can calculate the schedule grants for the cycle based on the congestion mode 644. A full cycle can include three schedule grants including the fixed information rate schedule grant 210, the low latency schedule grant 212, and the main schedule grant 214.

The calculate cycle schedule module 606 can determine the method of calculating the cycle schedule 218 based on the congestion mode 644 in a check mode module 702. The check mode module 702 can read the congestion mode 644 and if the congestion mode 644 indicates "congestion", then the control flow can pass to a congestion mode schedule module 704. If the congestion mode 644 indicates "non-congestion", then the control flow can pass to a non-congestion mode schedule module 706.

The congestion mode schedule module 704 can calculate the main schedule grant 214 when the congestion mode 644 indicates "congestion." The main schedule grant 214 defines the allocation of the available bandwidth 620 to satisfy the report request 720 of the active logical link identifier list 652. When the congestion mode schedule module 704 has completed, the control flow can pass to a write grant schedule module 708.

The main schedule grant 214 can include the bandwidth grant 222 for each of the logical link identifier 224 in the active logical link identifier list 652 that can define when the logical link identifier 224 can transmit information. The bandwidth grant 222 for the logical link identifier 224 can include a start time, a duration, the grant level 226 or any combination thereof. The grant level 226 defines a priority for the bandwidth grant 222 for the logical link identifier 224. For example, the grant level 226 can indicate a high priority, a medium priority, or a low priority.

The active logical link identifier list 652 can include an entry for the bandwidth grant 222 for each of the logical link identifier 224 that has the grant request 150. The bandwidth grant 222 for each of the logical link identifier 224 in the active logical link identifier list 652 can receive a minimum grant equal to the minimum of the two values represented by the minimum bandwidth 726 of the logical link identifier 224 or the report request 720 of the logical link identifier 224. The minimum grant ensures that each of the logical link identifier 224 in the active logical link identifier list 652 can receive some bandwidth in each cycle. For example, the minimum bandwidth 726 can include a committed information rate that defines the lowest information rate allowed.

The main schedule grant 214 can be calculated in a variety of methods. For example, the main schedule grant 214 can be calculated using a weighted maximum-minimum fairness method including using the fairness factor 641.

Each of the logical link identifier 224 in the active logical link identifier list 652 can be assigned the fairness factor 641 and the active logical link identifier list 652 can be sorted according to the fairness factor 641. The fairness factor 641 is a value used to implement the weighted maximum-minimum fairness method by calculating an index value and sorting the data based on the value.

The weighted maximum-minimum fairness method is implemented by having the network line terminal 102 fulfill the grant request 150 in sorted order until the available bandwidth 620 has been allocated. The grant request 150 can be fulfilled by creating the bandwidth grant 222 in the main schedule grant 214 and allocating the requested bandwidth to the bandwidth grant 222 in units of a maximum packet size 632.

Any remaining bandwidth can be distributed among the active logical link identifier list 652 using a round robin method by granting additional bandwidth in units of the maximum packet size 632. The maximum packet size 632 can be calculated in several ways. For example, the maximum packet size 632 can be set to a pre-defined value. In another example, the maximum packet size 632 can be calculated by the traffic monitor 510 based on the maximum observed packet size.

The fairness factor 641 is a value used to implement the weighted maximum-minimum fairness method by calculating an index value and sorting the data based on the value. The fairness factor 641 can be calculated in a variety of ways. For example, the fairness factor 641 for the logical link identifier 224 can be calculated by dividing the report request 720 by a weight factor 732.

The fairness factor 641 allows the available bandwidth 620 to be sorted so it can be divided fairly between the list of LLIDs requesting bandwidth. The available bandwidth 620 can be fairly allocated when the bandwidth is divided among the active logical link identifier list 652 based on the current demand and the service level agreement for each of the logical link identifier 224.

The non-congestion mode schedule module 706 can calculate the main schedule grant 214 when the congestion mode 644 indicates "non-congestion." The main schedule grant 214 defines the allocation of the available bandwidth 620 to satisfy the report request 720 of the active logical link identifier list 652. When the non-congestion mode schedule module 706 has completed, the control flow can pass to the write grant schedule module 708.

The active logical link identifier list 652 can include an entry for the bandwidth grant 222 for each of the logical link identifier 224 that have the grant request 150. The bandwidth grant 222 for each of the logical link identifier 224 in the active logical link identifier list 652 can receive a minimum grant of at least the minimum of the two values represented by the report request 720 or the minimum bandwidth 726 of the logical link identifier 224 plus the network overhead 621. The minimum grant ensures that each of the logical link identifier 224 in the active logical link identifier list 652 can receive some bandwidth in each cycle.

The main schedule grant 214 can be calculated in a variety of methods when the congestion mode 644 indicates "non-congestion". For example, the main schedule grant 214 can be calculated using a pre-allocation method with a weighted maximum-minimum fairness. The main schedule grant 214 can be calculated by pre-allocating the bandwidth grant 222 of the maximum packet size 632 for each of the logical link identifier 224 in the active logical link identifier list 652 while the available bandwidth 620 is greater than zero.

The available bandwidth 620 that remains can be distributed using a maximum-minimum fairness method. Each of the logical link identifier 224 in the active logical link identifier list 652 can be assigned the fairness factor 641 and the active logical link identifier list 652 sorted according to the fairness factor 641. The network line terminal 102 can fulfill the grant request 150 in sorted order until the available bandwidth 620 has been completely allocated. The grant request 150 can be fulfilled by creating the bandwidth grant 222 in the main schedule grant 214 and allocating the requested bandwidth to the bandwidth grant 222 in units of the maximum packet size 632.

The fairness factor 641 can be calculated in a variety of ways. For example, the fairness factor 641 calculated by adding the peak information rate 642 to the network overhead 621 and then subtracting the bandwidth grant 222 and then dividing the result by the weight factor 732.

It has been further discovered that the present invention provides the network line terminal 102 of FIG. 1 with improved speed for calculating the main schedule grant 214 by calculating the main schedule grant 214 based on the congestion mode 644. The congestion mode 644 can determine the method of calculating the main schedule grant 214. When the congestion mode 644 indicates "non-congestion", then the main schedule grant 214 can be calculated using a pre-allocation method. When the congestion mode 644 indicates "congestion", then the main schedule grant 214 can be calculated using a weighted maximum-minimum fairness factor to allocate bandwidth fairly to all network units. The congestion mode schedule module 704 and the non-congestion mode schedule module 706 can increase the speed of calculating the main schedule grant 214 by using the appropriate method to calculate the main schedule grant 214 based on the congestion mode 644. This allows for an improved dynamic bandwidth allocation where the network line terminal 102 can more efficiently calculate the main schedule grant 214.

The network line terminal 102 can update the main schedule grant table 554 with the main schedule grant 214 in the write grant schedule module 708. The write grant schedule module 708 can store the main schedule grant 214 in the main schedule grant table 554 of FIG. 5. When the write grant schedule module 708 has completed, the control flow can pass to the bookkeeping module 608 of FIG. 6.

Figure 8:
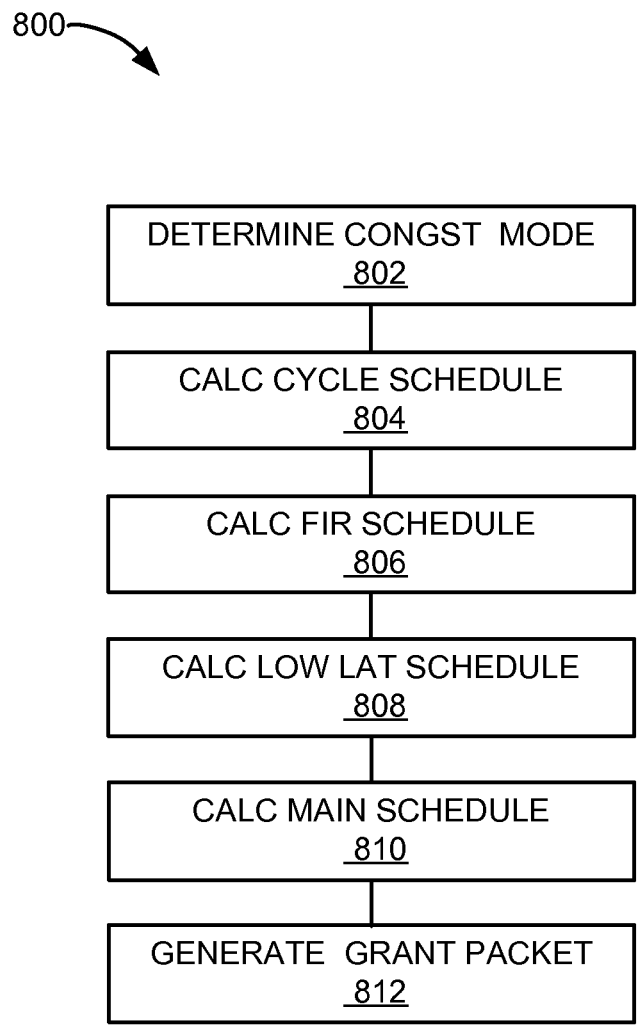
FIG. 8 is a flow chart of a method of operation of a network transport system with hybrid dynamic bandwidth allocation in a further embodiment of the present invention.

Referring now to FIG. 8 therein is shown a flow chart of a method 800 of operation of the network transport system 100 in a further embodiment of the present invention. The method 800 includes: determining a congestion mode in a block 802, calculating a cycle schedule in a block 804, calculating a fixed information rate schedule in a block 806, calculating a low latency schedule in a block 808, calculating a main schedule in a block 810, and generating a grant packet in a block 812.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another aspect of the present invention is that it valuably supports and services the historical trend of reducing costs, simplifying systems, increasing performance, reducing jitter, minimizing latency, and maximizing throughput.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a network transport system comprising:
    determining a congestion mode based on a total bandwidth request meeting or exceeding a bandwidth threshold, where the congestion mode indicates a level of network traffic and the total bandwidth request is a sum of all bandwidth requests for accessing the network;
    calculating a fixed information rate schedule grant based on a fixed information rate list to create a bandwidth grant for a fixed information rate request;
    calculating a low latency schedule grant based on a low latency list, the low latency list based on the list of logical link identifiers having a low latency request and the low latency schedule grant having the bandwidth grant with grant levels indicating priority;
    generating an active logical link identifier list including a logical link identifier with a token count meeting or exceeding a token count threshold;
    calculating a main schedule grant for allocating an available bandwidth to the active logical link identifier list, where the main schedule grant is calculated using a weighted maximum-minimum fairness method when the congestion mode indicates congestion;
    calculating a cycle schedule by aggregating the main schedule grant, the fixed information rate schedule grant, and the low latency schedule grant to define a transmission schedule for receiving network information at a network line terminal with the low latency schedule grant based on a traffic information report received for a current cycle; and
    generating a grant packet for defining a transmission schedule of a first network unit.

2. The method as claimed in claim 1 further comprising varying the bandwidth threshold based on a total bandwidth capacity to compensate for a network performance of the network.

3. The method as claimed in claim 1 wherein calculating the main schedule grant includes:
    calculating a fairness factor for the logical link identifier by dividing a report request by a weight factor; and
    sorting the main schedule grant based on the fairness factor using a sorting engine to allocate the available bandwidth of the main schedule grant.

4. The method as claimed in claim 1 further comprising:
    calculating the total bandwidth request by summing a minimum of either a report request or a peak information rate plus a network overhead for each element of a registered logical link identifier list.

5. The method as claimed in claim 1 wherein:
    determining the congestion mode indicates non-congestion; and
    calculating the main schedule grant includes pre-allocating the bandwidth grant of a maximum packet size for each logical link identifier of the active logical link identifier list.

6. A method of operation of a network transport system comprising:
    receiving a report packet having a grant request for a logical link identifier;
    calculating an available bandwidth based on the report packet;
    determining a congestion mode based on a total bandwidth request meeting or exceeding a bandwidth threshold, where the congestion mode indicates a level of network traffic and the total bandwidth request is a sum of all bandwidth requests for accessing the network;
    calculating a fixed information rate schedule grant based on a fixed information rate list to create a bandwidth grant for a fixed information rate request;
    calculating a low latency schedule grant based on a low latency list to create the bandwidth grant for a low latency list, the low latency list based on the list of logical link identifiers having a low latency request and the low latency schedule grant having the bandwidth grant with grant levels indicating priority;
    generating an active logical link identifier list including the logical link identifier with a token count meeting or exceeding a token count threshold;
    calculating a main schedule grant for allocating the available bandwidth to the active logical link identifier list, based on the congestion mode, where the main schedule grant is calculated using a weighted maximum-minimum fairness method when the congestion mode indicates congestion;

calculating a cycle schedule by aggregating the main schedule grant, the fixed information rate schedule grant, and the low latency schedule grant to define a transmission schedule for receiving network information at a network line terminal with the low latency schedule grant based on a traffic information report received for a current cycle; and generating a grant packet for defining a transmission schedule of a first network unit.

7. The method as claimed in claim 6 wherein calculating the fixed information rate schedule grant includes operating a hardware accelerator for calculating the fixed information rate schedule grant using a configured cycle time and a service level agreement information.

8. The method as claimed in claim 6 wherein calculating the low latency schedule grant includes operating a hardware accelerator for identifying the grant request of the logical link identifier as the low latency request.

9. The method as claimed in claim 6 wherein calculating the main schedule grant includes calculating a fairness factor by dividing a report request by a weight factor.

10. A network transport system comprising:
a control unit for determining a congestion mode based on a total bandwidth request meeting or exceeding a bandwidth threshold, where the congestion mode indicates a level of network traffic and the total bandwidth request is a sum of all bandwidth requests for accessing the network;

a hardware accelerator, coupled to the control unit, for calculating a fixed information rate schedule grant based on a fixed information rate list to create a bandwidth grant for a fixed information rate request;

a report processing module, coupled to the hardware accelerator, for calculating a low latency schedule grant based on a low latency list to create the bandwidth grant for a low latency list, the low latency list based on the list of logical link identifiers having a low latency request and the low latency schedule grant having the bandwidth grant with grant levels indicating priority;

a calculate schedule module, coupled to the control unit, for generating an active logical link identifier list including the logical link identifier with a token count meeting or exceeding a token count threshold;

a main schedule computation module, coupled to the control unit, for calculating a main schedule grant for allocating an available bandwidth to the active logical link identifier list, where the main schedule grant is calculated using a weighted maximum-minimum fairness method when the congestion mode indicates congestion;

a cycletime manager, coupled to the control unit, for calculating a cycle schedule by aggregating the main schedule grant, the fixed information rate schedule grant, and the low latency schedule grant to define a transmission schedule for receiving network information at a network line terminal with the low latency schedule grant based on a traffic information report received for a current cycle; and an arbiter module, coupled to the hardware accelerator, for generating a grant packet for defining a transmission schedule of a first network unit.

11. The system as claimed in claim 10 further comprising:
a congestion analysis module, coupled to the control unit, for varying the bandwidth threshold based on a total bandwidth capacity to compensate for the network performance of the network.

12. The system as claimed in claim 10 further comprising:
a divider, coupled to the hardware accelerator, for calculating a fairness factor for the logical link identifier by dividing a report request by a weight factor; and a sorting engine, coupled to the hardware accelerator, for sorting the main schedule grant based on the fairness factor using a sorting engine to allocate the available bandwidth of the main schedule grant.

13. The system as claimed in claim 10 wherein
the cycletime manager module is for calculating the total bandwidth request by summing a minimum of a report request or a peak information rate plus a network overhead for each element of a registered logical link identifier list.

14. The system as claimed in claim 10 further comprising:
a congestion analysis module, coupled to the control unit, for determining the congestion mode indicates non-congestion; and a main schedule grant table, coupled to the main schedule computation module, for calculating the main schedule grant includes pre-allocating the bandwidth grant of a maximum packet size for each logical link identifier of the active logical link identifier list.

15. The system as claimed in claim 10 further comprising:
a main schedule grant table, coupled to the report processing module, for receiving a report packet including a grant request for the logical link identifier; and
wherein:
the report processing module is for calculating the available bandwidth based on the report packet.

16. The system as claimed in claim 10 further comprising:
a traffic monitor module, coupled to the hardware accelerator, for calculating network statistics to improve network throughput.

17. The system as claimed in claim 15 wherein the hardware accelerator is for identifying the grant request of the logical link identifier as the low latency request.

18. The system as claimed in claim 15 further comprising a divider, coupled to the control unit, for calculating a fairness factor by dividing a report request by a weight factor.

* * * * *